United States Patent
Longobardi

(10) Patent No.: US 9,489,282 B2
(45) Date of Patent: Nov. 8, 2016

(54) SELECTIVE PURGING OF A LOG STRUCTURE

(71) Applicant: GLOBALFOUNDRIES Inc., Grand Cayman (KY)

(72) Inventor: Giuseppe Longobardi, Castellammare di Stabia (IT)

(73) Assignee: GLOBALFOUNDRIES INC., Grand Cayman (KY)

(*) Notice: Subject to any disclaimer, the term of this patent is extended or adjusted under 35 U.S.C. 154(b) by 104 days.

(21) Appl. No.: 14/255,497

(22) Filed: Apr. 17, 2014

(65) Prior Publication Data

US 2014/0359375 A1 Dec. 4, 2014

(30) Foreign Application Priority Data

May 28, 2013 (GB) .................................. 1309511.2

(51) Int. Cl.
*G06F 11/00* (2006.01)
*G06F 11/34* (2006.01)
*G06F 11/14* (2006.01)

(52) U.S. Cl.
CPC ....... *G06F 11/3476* (2013.01); *G06F 11/1402* (2013.01); *G06F 11/1469* (2013.01); *G06F 11/1471* (2013.01); *G06F 2201/81* (2013.01); *G06F 2201/865* (2013.01)

(58) Field of Classification Search
CPC .......................... G06F 11/1471; G06F 11/1469
See application file for complete search history.

(56) References Cited

U.S. PATENT DOCUMENTS

| | | | |
|---|---|---|---|
| 6,553,392 B1* | 4/2003 | Mosher, Jr. ......... | G06F 11/2069 |
| 6,728,949 B1 | 4/2004 | Bryant et al. | |
| 7,676,699 B2 | 3/2010 | Deily et al. | |
| 7,975,262 B2 | 7/2011 | Cozmei | |
| 2002/0073276 A1* | 6/2002 | Howard .............. | G06F 11/1471 711/113 |
| 2002/0194204 A1* | 12/2002 | Mosher, Jr. ......... | G06F 11/1471 |
| 2005/0223364 A1 | 10/2005 | Peri et al. | |
| 2008/0120349 A1* | 5/2008 | Kim .................. | G06F 17/30368 |
| 2008/0263044 A1 | 10/2008 | Cantrill | |
| 2009/0300295 A1 | 12/2009 | Eccles et al. | |
| 2011/0099149 A1* | 4/2011 | Kim .................... | G06F 11/1471 707/640 |
| 2011/0137874 A1* | 6/2011 | Grosman .......... | G06F 17/30377 707/688 |

(Continued)

FOREIGN PATENT DOCUMENTS

| | | | |
|---|---|---|---|
| CN | 102073578 A | * | 5/2011 |
| CN | 102073578 A1 | | 5/2011 |

OTHER PUBLICATIONS

UK Intellectual Property Office, Search Report for GB Application No. 1309511.2, Mailed Nov. 8, 2013.

(Continued)

*Primary Examiner* — Yolanda L Wilson
(74) *Attorney, Agent, or Firm* — Heslin Rothenberg Farley & Mesiti P.C.; George Blasiak

(57) ABSTRACT

A method, system, and/or computer program product log at least one stream of records in a data-processing system. A stream of records is received in succession. Records from the stream of records are logged into a log structure. In response to fulfillment of a pre-defined purging condition: the logging of the records are diverted to a buffer structure; the log structure is purged according to a set of purging criteria in response to the diverting; the records logged in the buffer structure are moved to the log structure in response to a completion of the purging; and the logging to the log structure is restored in response to a completion of the moving.

17 Claims, 6 Drawing Sheets

(56) References Cited

U.S. PATENT DOCUMENTS

| | | | |
|---|---|---|---|
| 2011/0289289 A1* | 11/2011 | Leshinsky | G06F 11/1448 711/162 |
| 2011/0289360 A1 | 11/2011 | Cathro | |
| 2013/0117235 A1* | 5/2013 | Schreter | G06F 17/30368 707/682 |
| 2013/0151895 A1* | 6/2013 | Lee | G06F 11/1658 714/19 |
| 2015/0212904 A1* | 7/2015 | Scanlon | G06F 11/1471 714/19 |

OTHER PUBLICATIONS

Anon, "Useful Windows scripts to clean-up old trace and log files, Window Scripts", Burleson Consulting, Oracle DBA Forum, Apr. 6, 2006, URL: "http://dbaforums.org/oracle/index/php?showtopic=3777", 1 page.

USPTO machine translation of CN102073578A, Method for Recording System Event Log; published May 25, 2011.

CN102073578A (cited with USPTO machine translation) Method for Recording System Event Log; published May 25, 2011.

* cited by examiner

SELECTIVE PURGING OF A LOG STRUCTURE

BACKGROUND

The present disclosure relates to the data-processing field. More specifically, this disclosure relates to the logging of information.

Logging (i.e., recording of information relating to events occurred over time into corresponding records of a memory structure, referred to as log) is a commonplace activity in several data-processing fields. For example, a particular application of the logging is tracing of a software program; in this case, the logged records relate to execution of the software program, and they are used for its debugging (either during development or after delivery of the software program).

Log analysis (i.e., scrutiny of logs in order to understand the corresponding events) poses many challenges. For example, in the case of the debugging of a software program, the corresponding log is analyzed in response to any error that results in malfunctioning thereof; this is aimed at extracting information about the context wherein the error occurred, which information may facilitate a diagnostic process (for determining a cause of the error and then taking appropriate corrective actions to fix it). For this purpose, since the errors may occur randomly, a time granularity of the log should be kept sufficiently high so as to ensure that all the records providing useful information for any possible errors are available when it is necessary; moreover, since the errors are relatively rare, most of the records relate to a correct operation of the program. However, this makes the log very large (i.e., verbose), so that it is quite difficult to identify the information of actual interest among the huge amount of records that are logged (most of which are irrelevant for debugging purposes).

Several techniques have been proposed in the art in an attempt to facilitate the log analysis.

For example, known prior art describes a profiling functionality that may be qualified by setting various qualifying flags at the request of a user, which qualifying flags may be used to limit the amount of trace data being generated or processed.

Other known prior art describes the use of configuration information to specify particular conditions under which trace events are to be logged.

Other known prior art describes the use of a very small trace buffer (typically, with 16 entries), which is compacted by removing traces from it before copying or moving the traces to some other storage location or before streaming them out in real-time.

Other known prior art describes creating a subordinate memory buffer whenever a nested subroutine is called inside a subroutine. Upon completion of each subroutine execution, the corresponding memory buffer is deleted; conversely, when an event is encountered during execution, all data in currently existing memory buffers are transferred to a secondary memory storage device.

Other known prior art describes logging trace messages in a trace log that is maintained in memory. The trace messages logged during execution of a portion of programming code are deleted when the portion of programming code executes without any error, whereas the trace messages are maintained in the trace log when an error occurs; when the execution of the programming code ends, the trace log is stored into a trace log file or it is displayed. In addition, a test log generated as described above may be merged with a product log including messages regarding actions performed during execution of the programming code.

However, any conditional logging is of no benefit when the information of interest is not known a priori (for example, for debugging purposes in the event of random errors).

Moreover, when the information is pre-processed in a working memory before its actual logging, a system crash would cause a loss of the information still to be logged; this pre-processing also involves a waste of memory space, and it involves a corresponding delay for the availability of the information in the log.

The use of distinct logs may instead cause synchronization errors when they are merged (for example, because of different time granularities); in any case, it requires a post-processing of the different logs for allowing a meaningful analysis thereof.

SUMMARY

A method, system, and/or computer program product log at least one stream of records in a data-processing system. A stream of records is received in succession. Records from the stream of records are logged into a log structure. In response to fulfillment of a pre-defined purging condition: the logging of the records are diverted to a buffer structure; the log structure is purged according to a set of purging criteria in response to the diverting; the records logged in the buffer structure are moved to the log structure in response to a completion of the purging; and the logging to the log structure is restored in response to a completion of the moving.

BRIEF DESCRIPTION OF THE SEVERAL VIEWS OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
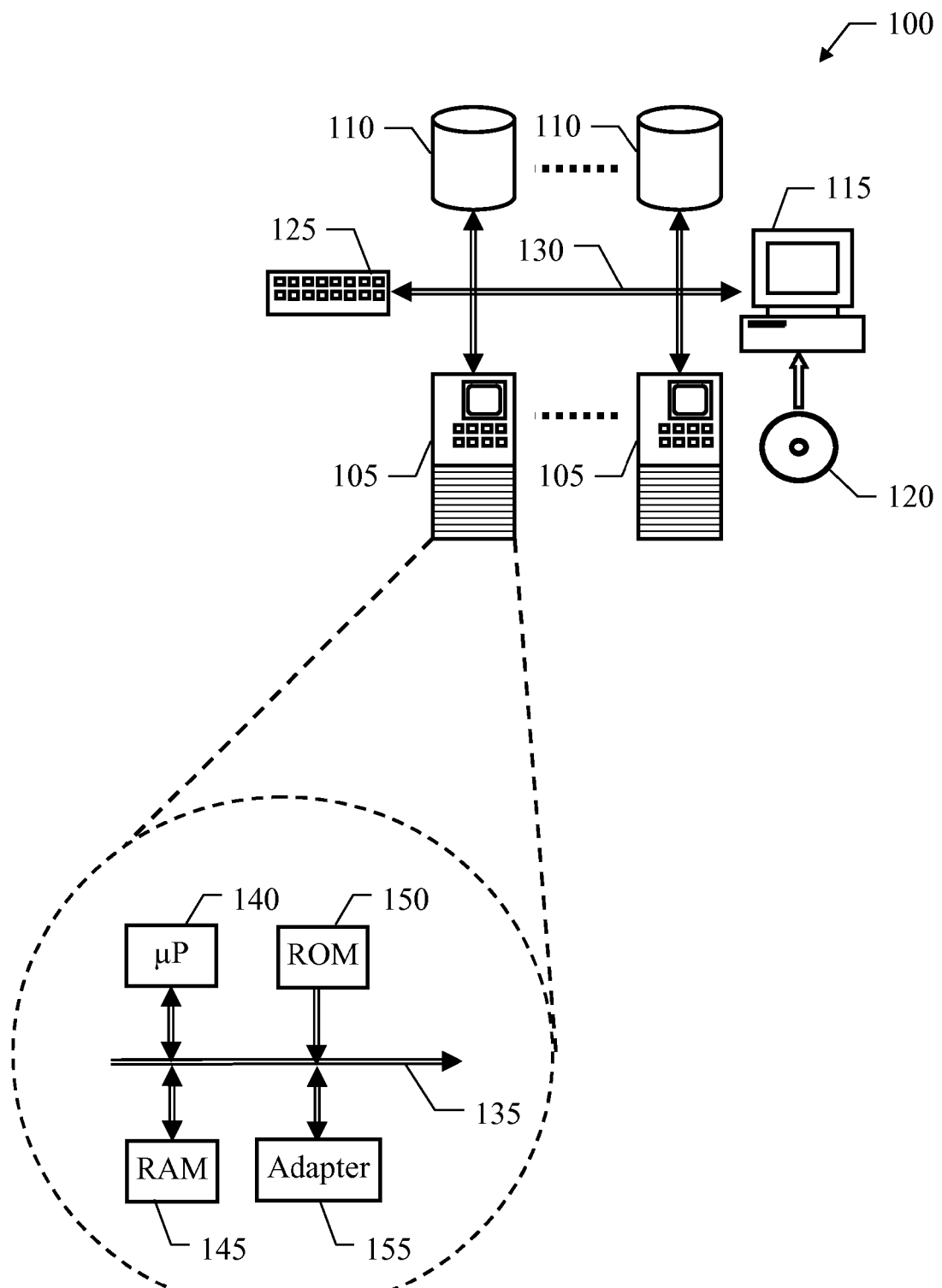
FIG. 1 shows a block-diagram of a data-processing system wherein the solution according to an embodiment of the present disclosure may be applied.

With reference in particular to the FIG. 1, a block-diagram is shown of a data-processing system 100 wherein the solution according to an embodiment of the present disclosure may be applied.

Particularly, the data-processing system 100 is a server farm that comprises several server computing machines, or simply servers, 105 (for example, of the rack or blade type) and storage disks 110 (for example, of the RAID type); the server farm 100 also comprises a console 115 for controlling the servers 105 and the disks 110 (for example, a personal computer), which console 115 is also provided with a drive for reading/writing removable storage devices 120 (for example, optical disks). A switch/router unit 125 manages communications among the servers 105, the disks 110 and the console 115, and with an external network (not shown in the figure); for this purposes, the servers 105, the disks 110 and the console 115 are connected to the switch/router unit 125 through a cabling structure 130.

A generic server 105 is formed by several units that are connected in parallel to a bus structure 135. In detail, a set of (one or more) microprocessors (μP) 140 controls operation of the server 105; a RAM 145 is directly used as a working memory by the microprocessors 140, and a ROM 150 stores basic code for a bootstrap of the sever 105. Moreover, the server 105 comprises a network adapter 155, which is used to connect the server 105 to the cabling structure 130.

With reference now to the FIG. 2A-FIG. 2D, a pictorial representation is shown of an exemplary application of the solution according to an embodiment of the present disclosure.

Figure 2A:
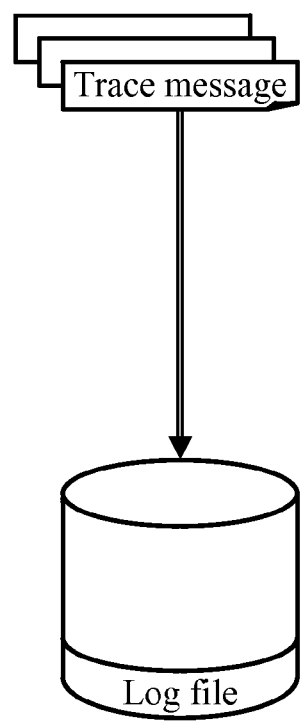
FIG. 2A-FIG. 2D show a pictorial representation of an exemplary application of the solution according to an embodiment of the present disclosure.

Starting from the FIG. 2A, a stream of records to be logged is received (for example, trace messages issued over time by a software program running in the above-described server farm). The trace messages are logged (i.e., stored in succession) into a log structure (for example, a log file) as usual.

Figure 2B:
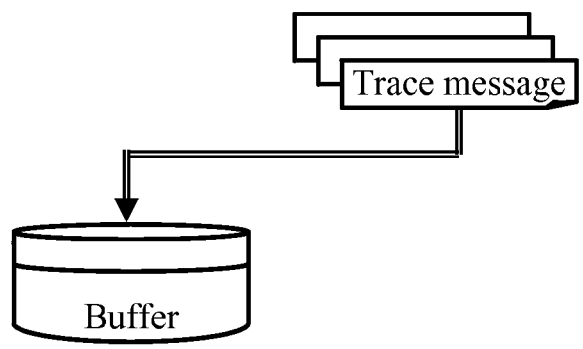
Figure 2B:
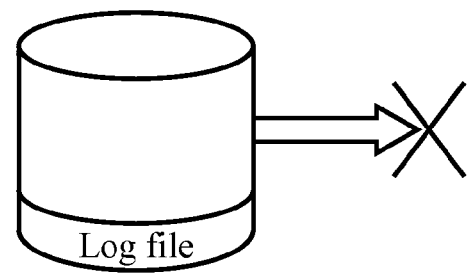

Moving to the FIG. 2B, whenever a pre-defined purging condition is fulfilled (for example, when the size of the log file reaches a threshold), the logging of the trace messages is diverted to a buffer structure, or simply buffer; in this way, new trace messages are stored into the buffer, whereas the log file is not used any longer. In the meanwhile, the log file is purged according to one or more purging criteria (for example, by deleting the trace messages of a specific type when a trace message of another type is logged).

Figure 2C:
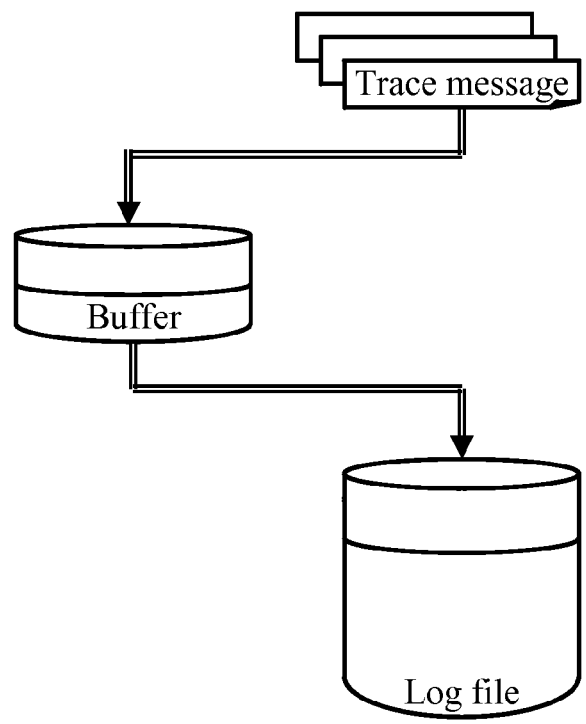

Moving to the FIG. 2C, once the purging of the log file has been completed, the trace messages that have been logged in the buffer in the meanwhile are moved to the log file (while any new trace messages that are still logged into the buffer); for this purpose, the trace messages are spilled from the buffer (i.e., extracted in succession with a First-In-First-Out, or FIFO, policy) and they are added to the log file, so that their temporary storing in the buffer is completely opaque to the log file.

Figure 2D:
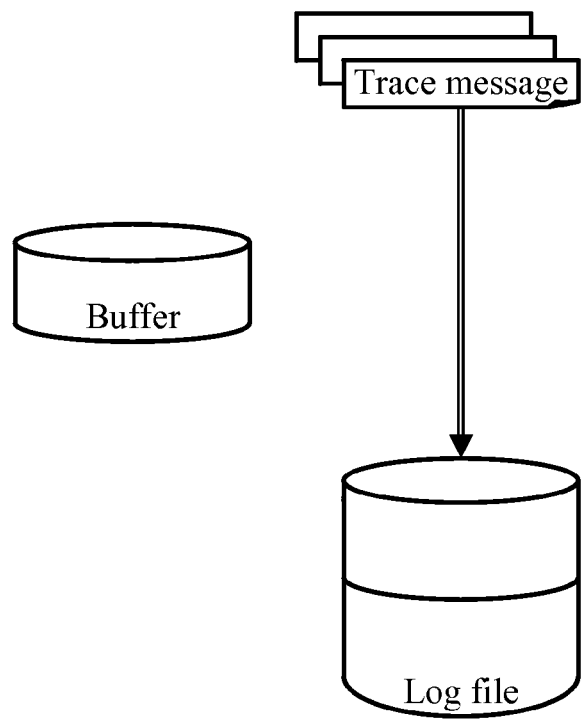

Moving to the FIG. 2D, once all the trace messages have been moved from the buffer to the log file (i.e., the buffer is empty), the logging of the trace messages is restored to the log file, so as to return to the same condition of the FIG. 2A (waiting for a next fulfillment of the purging condition).

The above-described solution significantly facilitates the log analysis.

Indeed, in this way it is possible to maintain a higher granularity of the log structure, so as to ensure that the records providing useful information for any possible situation are available when it is necessary (for example, when an error occurs randomly); at the same time, the records in the log structure may be purged when they are not useful any longer (with a sort of self-destroying capability thereof). As a result, the size of the log structure may be maintained relatively small without a substantial reduction of its informative content; this facilitates the identification of the information of actual interest among the records that are logged, since the irrelevant ones for the specific purpose have been deleted, at least in part (for example, for debugging purposes when only the trace messages relating to the context wherein any error may occur are left).

Moreover, the purging may be based on purging criteria depending on dynamic conditions (for example, for deleting records after the occurrence of specific events).

This purging of the log structure is performed on the records that have already been logged therein; nevertheless, the operation is performed in a quasi real-time way, so as to maintain a clean situation of the log structure.

In this way, risk of loosing information is substantially reduced. Indeed, even if the buffer structure is stored in the working memory (in order to increase the performance), a system crash might cause a loss of information only during the short time of purging, and in any case only for the most recent records in the buffer structure. Moreover, this risk may be practically cancelled when the buffer structure as well is stored in the mass memory (with a negligible reduction of the performance in view of the relatively low number of records that are stored in the buffer structure and then moved to the log structure).

The buffer structure may be allocated only when it is necessary during the purging, and in any case its size is relatively small (so that the corresponding waste of memory space is negligible).

The records are logged directly into the log structure (without requiring any pre-processing for their purging); this reduces delay for the availability of the information in the log structure.

The desired result may be achieved without using distinct logs (and then without the corresponding possible synchronization errors and post-processing).

Figure 3:
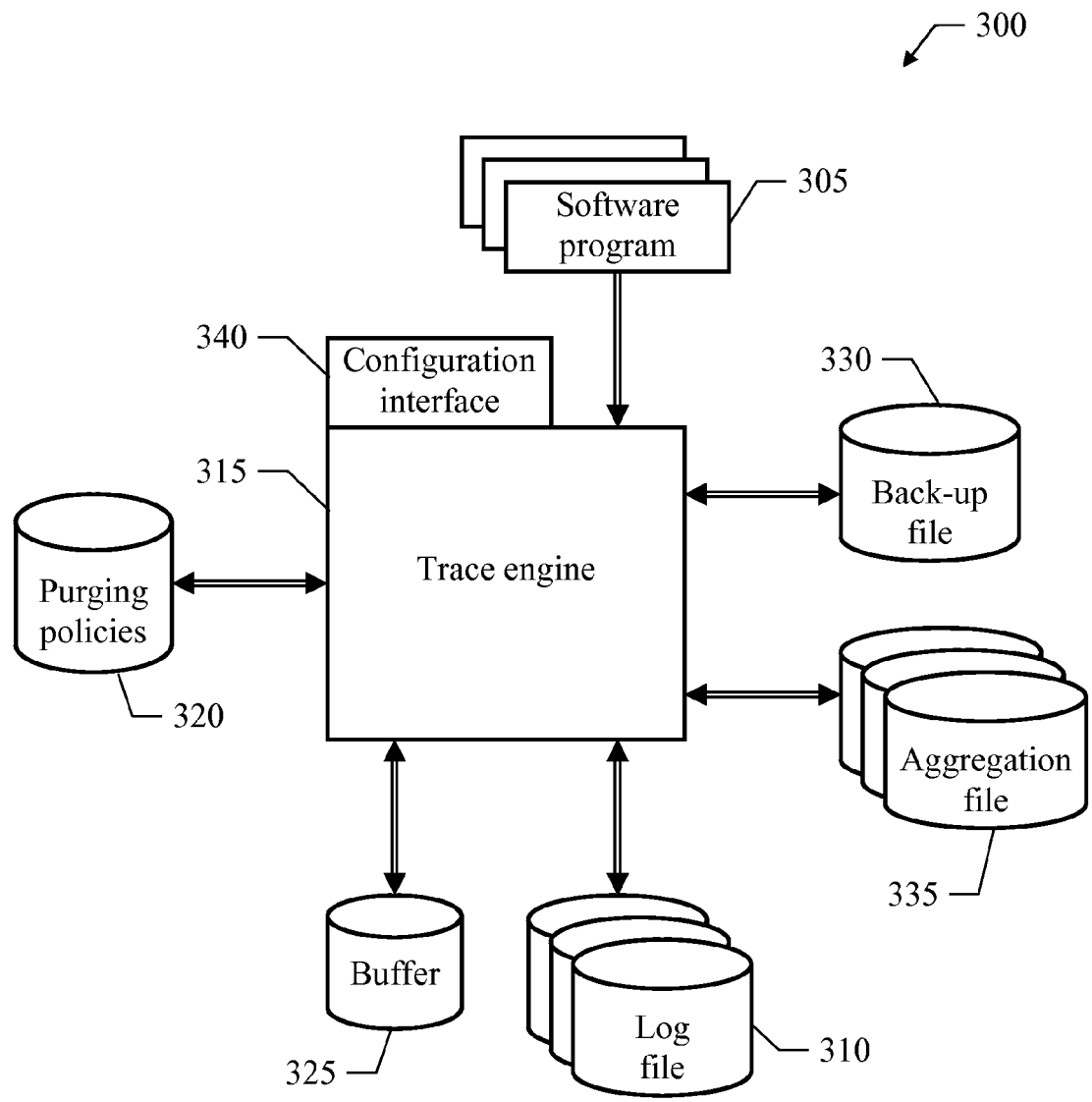
FIG. 3 shows the main software components that may be used to implement the solution according to an embodiment of the present disclosure.

With reference now to the FIG. 3, the main software components are shown that may be used to implement the solution according to an embodiment of the present disclosure.

Particularly, the software components (programs and data) are denoted as a whole with the reference 300. The software components are typically stored in the mass memory and loaded (at least partially) into the working memory of a generic server when the programs are running, together with an operating system (not shown in the figure). The programs are initially installed onto the mass memory, for example, from removable storage devices or from the network. In this respect, each software component may represent a module, segment or portion of code, which comprises one or more executable instructions for implementing the specified logical function.

More in detail, one or more software programs 305 run on the server (for example, web applications implementing services in a cloud computing environment). The software programs 305 (or at least part of them) are instrumented for tracing their execution by issuing corresponding trace messages. Generally, the tracing may be configured, either statically at the lunching of the software programs 305 or dynamically during their execution; for example, an operator (such as a software programmer) may disable/enable the tracing, and in the latter case s/he may select a trace level defining a corresponding time granularity (such as a higher trace level for tracing function calls, a medium trace level for tracing variable settings, and a lower trace level for tracing loop iterations).

The trace messages that are issued by each software program 305 over time (according to its tracing configuration) are normally logged into a corresponding log file 310.

In the solution according an embodiment of the present disclosure, a trace engine 315 (for example, implemented as an extension of a disk drive of the operating system) bridges between the software programs 305 and their log files 310, in order to implement the above-described purging. For this purpose, the trace engine 315 accesses a repository 320 storing a purging policy for each software program 305. Particularly, the purging policy comprises the purging condition for triggering the purging of its log file 310, and the corresponding (one or more) purging criteria; moreover, the purging policy may comprise one or more filtering criteria for filtering the logging of the trace messages issued by the software program 305 (for example, based on one or more purging criteria).

The trace engine 315 allocates a buffer 325 whenever the purging of any log file 310 is triggered (for example, a single buffer 325 when only one purging may be in progress at any time, or a different buffer 325 for each software program 305 otherwise). Preferably, the trace engine 315 also controls a back-up structure 330 (for example, a back-up file), which is used to copy every trace message that is deleted from the log files 310 during their purging.

As a further improvement, the purging policies in the repository 320 for some software programs 305 may comprise one or more aggregation criteria for aggregating the corresponding trace messages that are deleted from their log files 310 into a common aggregation structure 335 (for example, an aggregation file); for example, the operator may simply enable/disable this aggregation functionality, with the specification of the corresponding aggregation file 335 in the latter case.

The trace engine 315 also exposes a configuration interface 340. The operator may use the configuration interface 340 to view, create, edit or delete the purging policies in the repository 320; moreover, s/he may use it to control operation of the trace engine 315 (for example, for configuring the tracing, restoring the trace messages from the back-up file 330, browsing the log files 310 or the aggregation files 335, and the like).

Figure 4A:
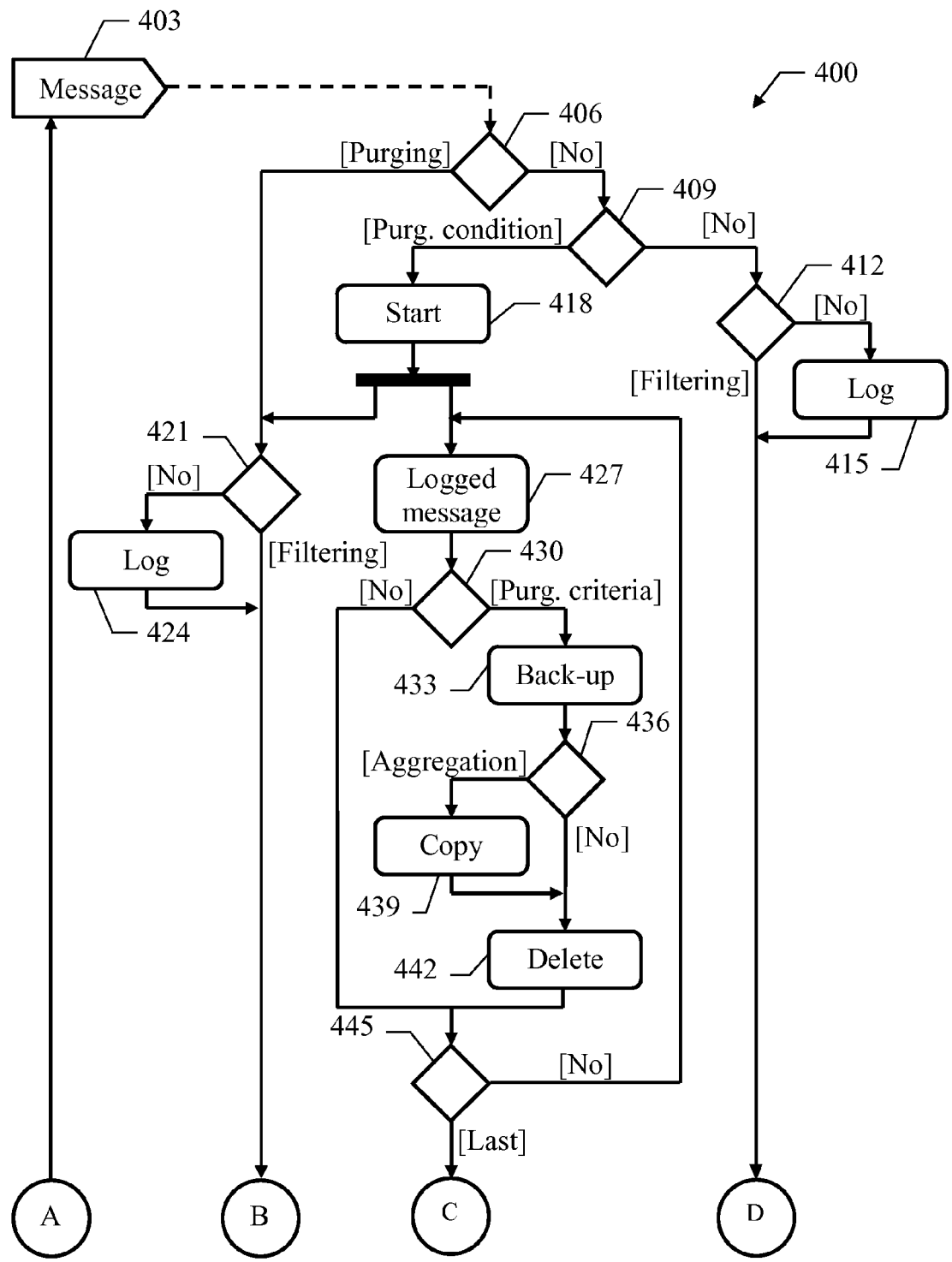
FIG. 4A-FIG. 4B show an activity diagram describing the flow of activities relating to an implementation of the solution according to an embodiment of the present disclosure.
Figure 4B:
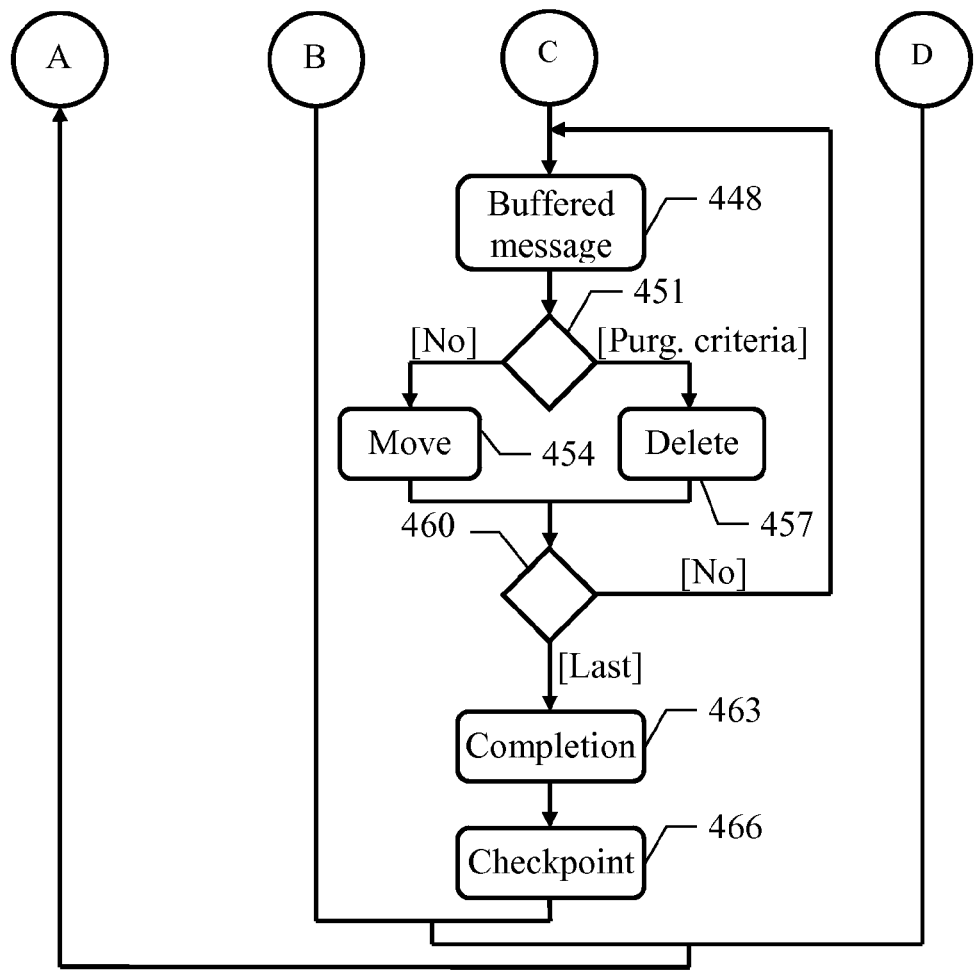
Figure 4B:
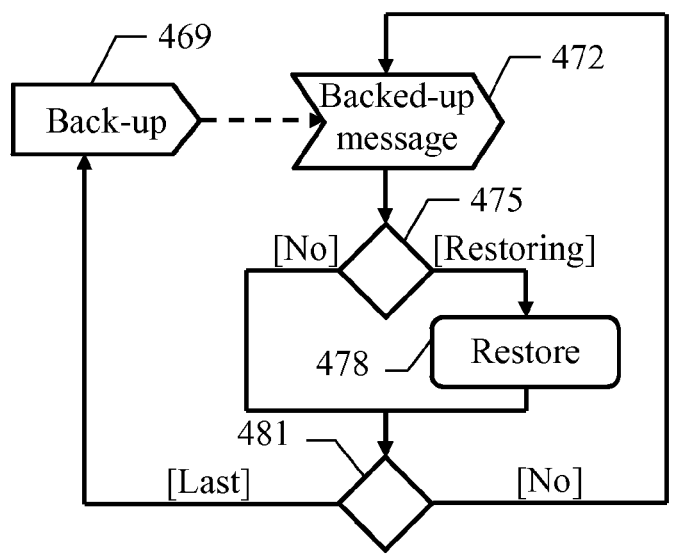

With reference now to the FIG. 4A-FIG. 4B, an activity diagram is shown describing the flow of activities relating to an implementation of the solution according to an embodiment of the present disclosure.

Particularly, the diagram represents an exemplary process that may be used to log trace messages in a generic server with a method 400. In this respect, each block may represent one or more executable instructions for implementing the specified logical function on the server.

More in detail, the process is in a waiting condition at block 403 for the issue of the trace messages to be logged into the corresponding log files by the running software programs wherein the tracing functionality has been enabled (which trace messages are intercepted by the trace engine before their logging, for example, with hooking techniques). The trace messages have a pre-defined format (for example, conforming to the Common Base Event, or CBE, format); particularly, each trace message may comprise an identification code (for example, for function calls, variable settings, start loops, end loops, errors), a time-stamp (for the time of its issue), a module code (for an identifier of a module of the software program that issued it), a descriptive text, and the like. As soon as a (new) trace message is received, the process passes to block 406 wherein a test is performed to verify whether the purging of the corresponding log file is in progress (for example, as indicated by a purging flag).

If not (i.e., when the purging flag is deasserted), the tracing condition of the corresponding software program (previously retrieved from its purging policy) is evaluated at block 409. For example, the purging condition is defined by a threshold for the log file (such as measured by a number of the trace messages logged therein). If the purging condition is not fulfilled (for example, when a counter indicating the number of trace messages in the log file is lower than the threshold), the process descends into block 412; in this phase, the corresponding filtering criteria (previously retrieved from the purging policy) are evaluated against the trace message according to one or more attributes thereof (for example, its identification code, time-stamp and module code). For example, the filtering criteria may be equal to the purging criteria (described in detail in the following) that are based on the content of the log file (such as for filtering the trace messages of a specific type, as defined by its identification code and/or module code, when a trace message of another type is logged). If the filtering criteria are not fulfilled, the trace message is logged into the log file at block 415. The process then returns to the block 403 waiting for a new trace message; the same point is instead reached directly from the block 412 when the filtering criteria are fulfilled (so that the trace message is discarded). In this way, it is possible to prevent the logging of the trace messages that are not useful any longer, dynamically.

Referring back to the block 409, if the purging condition is fulfilled (i.e., the message counter reaches the threshold), the purging of the log file is triggered at block 418 (i.e., by asserting the purging flag). In this way, it is possible to control the size of the log file in a very effective way. The process then forks at a synchronization bar into two branches that are executed concurrently.

Particularly, a first branch begins at block 421, wherein the filtering criteria are evaluated against the trace message as above. If the filtering criteria are not fulfilled, the trace message is logged into the (corresponding) buffer at block 424. The process then returns to the block 403 waiting for a new trace message; the same point is instead reached directly from the block 421 when the filtering criteria are fulfilled (so that the trace message is discarded).

At the same time, a second branch begins at block 427, wherein a loop is entered for processing each trace message of the log file (after a purging checkpoint, being set as described in the following); in this phase, the attributes of a (current) trace message are extracted from the log file, starting from the first one following the purging checkpoint. The corresponding purging criteria (previously retrieved from the purging policy) are evaluated against the trace message at block 430 according to its attributes.

Different kind of purging criteria (either alone or combined one to another) may be used according to contingent needs. Particularly, the purging criteria may be defined by temporal characteristics of the trace messages. For example, a purging criterion may be defined by a time threshold for an age of the trace messages measured by a difference between a current time and their time-stamps; in this way, it is possible to purge the oldest trace messages, so as to retain only the most recent ones that are likely to be useful. In addition or in alternative, the purging criteria may be defined by a type of the trace messages. For example, a purging criterion may be defined by a selected type, i.e., identification code or module code, defined either specifically or with a wild card; in this way, it is possible to purge the trace messages of any desired type. In addition or in alternative, the purging criteria may be defined by a content of the log file. For example, a purging criterion may be defined by the logging of a trace message of a specific type; in this way, it is possible to purge the trace messages after the occurrence of any event.

If the purging criteria are determined to be fulfilled at the block 430, the process descends into block 433. In this phase, the trace message (to be deleted from the log file) is at first copied into the back-up file; for example, a common back-up file may be used for the software programs (with their trace messages that are discriminated by corresponding identifiers that are associated thereto). As a further improvement, the trace message in the back-up file is also associated with an indication of the corresponding fulfilled purging criteria that caused its purging (for allowing its selective restoring, as described in the following). Continuing to block 436, the corresponding aggregation criteria (previously retrieved from the purging policy) are evaluated against the trace message (possibly according to its attributes); for example, the aggregation criteria may be defined by a simple aggregation flag for enabling/disabling the aggregation functionality for every trace message being deleted from the log file. If the aggregation criteria are fulfilled (i.e., the aggregation flag is asserted), the trace message is copied at block 439 into the corresponding aggregation file (as indicated in the purging policy) so as to maintain the correct chronology thereof; for example, the aggregation file may be scanned backwards until an earlier trace message is found (as indicated by a comparison of their time-stamps), and the (new) trace message is inserted after it. In this way, it is possible to aggregate selected trace messages of different software programs; for example, this allows aggregating the trace messages for a specific service that is implemented by a number of different instances of a same software program (such as in a cloud environment). The process then continues to block 442; the same point is instead reached directly from the block 436 when the aggregation criteria are not fulfilled (so that the trace message is not copied into any aggregation file). In any case, the trace message is now deleted from the log file (either automatically or after a manual confirmation). A test is then made at block 445 to verify whether all the trace messages in the log file have been processed. If not, the process returns to the block 427 to process a next trace message.

For example, a purging criterion may define the deletion of every trace message MSG1 (for example, indicating a call to a function) between a trace message MSG2 and a trace message MSG3 (for example, indicating the start and the end of a loop). The purging is triggered at the beginning on the following log file:
 MSG2
 MSG1.
In this case, no trace message is deleted (since the loop has not been completed yet). The purging is then triggered on the following log file:
 MSG2
 MSG1
 MSG3
 MSG1.
In this case, the first trace message MSG1 (inside the loop) is deleted, whereas the second trace message MSG1 (outside the loop) is retained:
 MSG2
 MSG3
 MSG1.

For example, in this way it is possible to delete the trace messages that are useless for debugging purpose, since they have been issued in a portion of code that executed correctly and then it should not be the origin of errors.

Once all the trace messages have been processed, the above-described loop is exit by descending from the block 445 into block 448. In this phase, a further loop is entered for processing each trace message that has been logged in the buffer in the meanwhile; for this purpose, the attributes of a (current) trace message are extracted from the buffer, starting from the first one logged therein (i.e., the oldest one). The purging criteria are evaluated against the trace message as above at block 451. If the purging criteria are not fulfilled, the trace message is moved from the buffer to the log file at block 454; conversely, the trace message is deleted from the buffer at block 457. In this way, the trace message is added to the log file (so as to maintain the correct chronology) only when it is necessary, whereas it is discarded otherwise. In both cases, the process then continues to block 460 (from either the block 454 or the block 457). At this point, a test is made to verify whether all the trace messages in the buffer have been processed. If not, the process returns to the block 448 to process a next trace message. Conversely (i.e., once the buffer has been emptied), the above-described loop is exit by descending into block 463, wherein the purging flag is deasserted (to indicate the completion of the purging and to restore the logging of the trace messages in the log file). The purging checkpoint is then updated accordingly at block 466. Particularly, the purging checkpoint indicates the trace message in the log file (for example, by means of its progressive number therein) from which the next purging has to start. For this purpose, the purging checkpoint (initialized to the first trace message at the beginning) is set according to a comparison between the purging criteria and a current content of the log file. For example, when the purging criteria define the purging of the trace messages of a specific type, the purging checkpoint is set to the first trace message of this type in the log file. In this way, it is possible to limit the scanning of the log file during the purging only to the part thereof that may comprise trace messages to be deleted. The branch then ends by returning to the block 403 waiting for a new trace message.

In an independent way, the process passes from block 469 to block 472 as soon as a back-up command is submitted. The back-up command comprises an identifier of the software program whose trace messages (deleted from its log file) have to be restored. Moreover, the back-up command comprises one or more restoring criteria, which may be based on the corresponding purging criteria; for example, the restoring criteria may be equal to one or more purging criteria based on the content of the log file (as such for restoring the trace messages of a specific type that have been deleted when a trace message of another type has been logged). In response to the back-up command, a loop is entered for processing each trace message of the back-up file. For this purpose, with respect to a (current) trace message of the back-up file (starting from the first one), the identifier of the software program (which the trace message relates to) and the fulfilled purging criteria (which caused its purging) are extracted from the back-up file. With reference now to block 475, if the trace message relates to the same software program of the back-up command (i.e., their identifiers are the same), the restoring criteria are evaluated against the fulfilled purging criteria of the trace message. If the restoring criteria are fulfilled (i.e., they are equal to the fulfilled purging criteria), the trace message is restored to the corresponding log file (as indicated by the identifier of the software program)—i.e., the trace message is moved from the back-up file to the log file so as to maintain the correct chronology; for example, the log file may be scanned backwards until an earlier trace message is found (as indicated by a comparison of their time-stamps), and the (backed-up) trace message is inserted after it. In this way, it is possible to restore the trace messages selectively according to their purging; particularly, it is possible to restore the trace messages that had been purged according to a specific content of the log file. For example, this allows restoring trace messages of interest for an error that occurred shortly after their deletion. The process then continues to block 481; the same point is also reached directly from the block 475 when the trace message does not relate to the same software program of the back-up command or the restoring criteria are not fulfilled (so as to leave it in the back-up file). At this point, a test is made to verify whether all the trace messages of the back-up file have been processed. If not, the process returns to the block 472 to process a next trace message. Conversely, the above-described loop is exit by returning to the block 469 waiting for a next back-up command.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for logging at least one stream of records in a data-processing system. For each stream of records the method comprises the following steps. The records are received in succession. The records are logged into a log structure. The following steps are performed in response to each fulfillment of a predefined purging condition. The logging of the records is diverted to a buffer structure. The log structure is purged according to a set of purging criteria in response to the diverting. Each record logged in the buffer structure is moved to the log structure in response to a completion of the purging. The logging to the log structure is restored in response to a completion of the moving.

However, the records may be logged on any data-processing system (see below). The records may be of any type (for example, providing error, warning, audit, security, monitoring, functional information); moreover, the records may have any format, and they may comprise different, additional or alternative attributes (for example, a flow identifier, a group identifier). The records may be provided by any entity (for example, a web service, a management application, an operating system, a hardware structure) and they may relate to any operative condition thereof (for example, development, test, installation, production); the records may be received in any way (for example, with wrapping techniques). The log structure and the buffer structure may be of any type (for example, tables, databases, arrays, pointer-based lists). The purging condition and the purging criteria may be of any type and in any number (see below); moreover, they may be defined in any way (for example, in a table or with logical rules) and at any time (for example, statically at a developing stage and/or dynamically at run-time). The purging may be implemented in any way (for example, with the log structure that is loaded into the working memory, modified, and then replaced in the mass memory).

In an embodiment, the method further comprises verifying the fulfillment of the purging condition by comparing a size of the log structure with a threshold in response to the receipt of each record.

However, different, additional or alternative purging conditions may be used; for example, the purging condition may be defined by a threshold for the number of records being received; moreover, the purging condition may be defined by multiple clauses combined with any logical operators. In any case, the fulfillment of the purging condition may be verified in any way, even independently of the receipt of the records (for example, by simply triggering the purging periodically).

In an embodiment, the buffer structure is stored in a mass memory of the data-processing system.

However, the buffer structure may be stored anywhere, comprised in the working memory of the data-processing system.

In an embodiment, at least one of the purging criteria is based on a temporal characteristic of the records.

However, the purging criteria may be based on any temporal characteristic of the records (for example, the time-stamp of their logging, or a simple indication of a logging period, for example, day, night, working day, holiday).

In an embodiment, at least one of the purging criteria is based on a content of the log structure.

However, the purging criteria may be based on any characteristic relating to the content of the log structure (for example, the number of specific records).

In an embodiment, at least one of the purging criteria is based on a type of the records.

However, the type of the records may be defined in any way (for example, according to its informative content, such as relating to error, warning, audit, security, monitoring, functional events).

In an embodiment, at least one of the purging criteria involves a deletion of each record of at least one first type logged in the log structure according to the logging of at least one record of at least one second type in the log structure.

However, the deletion of the records may be based on any other criteria depending on their types and on the content of the log structure (for example, with the deletion that may involve all the records of one or more specific types or only the ones between records of other types, and with the deletion that may be conditioned to a specific sequence of records of different types in the log structure).

More generally, different, additional or alternative purging criteria may be defined, down to a single one or with more of them combined with any logical operators (for example, based on a trace level of the records).

In an embodiment, the step of moving comprises discarding the records logged in the buffer structure according to the purging criteria.

However, all the records in the buffer structure may be always moved to the log structure without any verification of the purging criteria (for example, in order to speed up the operation when the buffer structure is stored in the working memory).

In an embodiment, the step of purging comprises copying each record being deleted from the log structure during the purging thereof into a back-up structure in association with an indication of the corresponding fulfilled purging criteria; the method further comprises receiving a restoring command comprising an indication of a set of (one or more) restoring criteria based on the purging criteria, and restoring each record from the back-up structure to the log structure, according to a comparing between the restoring criteria and the corresponding fulfilled purging criteria, in response to the restoring command.

However, the back-up structure may be of any type (for example, a corresponding back-up file for each stream of records); moreover, different, additional or alternative restoring criteria may be defined (for example, for all the records that have been purged during selected previous purging), which restoring criteria may even be independent of the purging criteria (for example, simply based on the purging time). In any case, this feature may also be omitted in a simplified implementation (for example, in order to reduce the waste of memory space when the need of using the purged records is unlikely).

In an embodiment, said at least one stream of records comprises at least one set of multiple streams of records; the step of purging comprises copying each record from each log structure of the set of multiple streams of records into a common aggregation structure according to a set of aggregation criteria comprised in the purging criteria.

However, it is possible to have any number of aggregation structures, each one for any number of (two or more) log structures selected in any way (for example, relating to a same server, to a same aspect such as security); moreover, each log structure may be of any type (for example, with an identifier of the log structure of each trace message associated therewith). The records may be copied into the aggregation structure in any way (for example, by simply adding them at the end of the aggregation structure and sorting it after the completion of every purging). In any case, this feature is merely optional and it may be not supported in a basic implementation.

In an embodiment, the method further comprises filtering the records to be logged according to a set of (one or more) filtering criteria based on a content of the log structure.

However, different, additional or alternative filtering criteria may be defined, even independently of the purging criteria (for example, being set temporarily), or they may be omitted at all.

In an embodiment, the step of purging comprises scanning the log structure for the purging thereof starting from a purging checkpoint; the method further comprises updating the purging checkpoint in response to the completion of the purging according to a comparison between the purging criteria and a content of the log structure.

However, the purging checkpoint may be defined in any way (for example, by a record identifier), according to different, additional or alternative criteria, even independently of the purging criteria (for example, simply following the last record processed during the purging); in any case, the possibility of scanning the whole log structure at every purging is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program for causing a data-processing system to perform the steps of the above-mentioned method when the computer program is executed on the data-processing system.

Thus present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A further embodiment provides a system comprising means for performing the steps of the above-described method.

However, this method may also be carried out on a system based on a different architecture (for example, a local, wide area, global, cellular or satellite network), and exploiting any type of (wired and/or wireless) connections. However, its implementation on a stand-alone computer is not excluded.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

As described herein, solution for logging at least one stream of records in a data-processing system is presented. A corresponding method (400) comprises, for the stream of records, receiving (403) the records in succession, logging (412-415) the records into a log structure, and in response (409) to fulfillment of a pre-defined purging condition diverting (418-424) the logging of the records to a buffer structure, purging (427-445) the log structure according to a set of purging criteria in response to the diverting, moving (448-460) the records logged in the buffer structure to the log structure in response to a completion of the purging, and restoring (463) the logging to the log structure in response to a completion of the moving.

A simplified summary of the present disclosure is herein presented in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In general terms, the present disclosure is based on the idea of implementing a purging schema.

Particularly, one or more aspects of the present disclosure are set out in the independent claims and advantageous features thereof are set out in the dependent claims, with the wording of all the claims that is herein incorporated verbatim by reference (with any advantageous feature provided with reference to a specific aspect that applies mutatis mutandis to every other aspect).

More specifically, an aspect provides a method for logging at least one stream of records in a data-processing system, wherein for the stream of records their logging into a log structure is diverted to a buffer structure (in response to each fulfillment of a pre-defined purging condition) for purging the log structure according to a set of purging criteria (with each record logged in the buffer structure that is moved to the log structure after its completion).

A further aspect provides a corresponding computer program (and a corresponding computer program product).

A further aspect provides a corresponding system.

What is claimed is:

1. A method for logging at least one stream of records in a data-processing system, for each stream of records the method comprising:
   receiving a stream of records in succession, logging records from the stream of records into a log structure, and in response to fulfillment of a pre-defined purging condition: diverting the logging of the records to a buffer structure, purging the log structure according to a set of purging criteria in response to the diverting, moving the records logged in the buffer structure to the log structure in response to a completion of the purging, and restoring the logging to the log structure in response to a completion of the moving, wherein at least one of the purging criteria involves a deletion of each record of at least one first type logger in the log structure according to the logging of at least one record of at least one second type in the log structure.

2. The method according to claim 1, further comprising:
   verifying the fulfillment of the purging condition by comparing a size of the log structure with a threshold in response to the receipt of each record.

3. The method according to claim 1, wherein the buffer structure is stored in a mass memory of the data-processing system.

4. The method according to claim 1, wherein at least one of the purging criteria is based on a temporal characteristic of the records.

5. The method according to claim 1, wherein said moving the records comprises:
   discarding the records logged in the buffer structure according to the purging criteria.

6. The method according to claim 1, further comprising:
   copying the records being deleted from the log structure during the purging thereof into a back-up structure in association with an indication of the corresponding fulfilled purging criteria;
   receiving a restoring command comprising an indication of a set of restoring criteria based on the purging criteria; and
   restoring the records from the back-up structure to the log structure, according to a comparing between the restoring criteria and the corresponding fulfilled purging criteria, in response to the restoring command.

7. The method according to claim 1, wherein said at least one stream of records comprises at least one set of multiple streams of records, and wherein said purging the log structure comprises:
   copying the records from the log structure of the set of multiple streams of records into a common aggregation structure according to a set of aggregation criteria comprised in the purging criteria.

8. The method according to claim 1, further comprising:
   filtering the records to be logged according to a set of filtering criteria based on a content of the log structure.

9. The method according to claim 1, further comprising:
   scanning the log structure for the purging thereof starting from a purging checkpoint; and
   updating the purging checkpoint in response to the completion of the purging according to a comparison between the purging criteria and a content of the log structure.

10. A computer program product for logging at least one stream of records in a data-processing system, the computer program product comprising a computer readable storage medium having program code embodied therewith, the program code readable and executable by a processor to perform a method comprising:
    receiving a stream of records in succession,
    logging records from the stream of records into a log structure, and
    in response to fulfillment of a pre-defined purging condition:
      diverting the logging of the records to a buffer structure,
      purging the log structure according to a set of purging criteria in response to the diverting,
      scanning the log structure for the purging thereof starting from a purging checkpoint,
      updating the purging checkpoint in response to the completion of the purging according to a comparison between the purging criteria and a content of the log structure,
      moving the records logged in the buffer structure to the log structure in response to a completion of the purging, and
      restoring the logging to the log structure in response to a completion of the moving.

11. The computer program product of claim 10, wherein the method further comprises:
    verifying the fulfillment of the purging condition by comparing a size of the log structure with a threshold in response to the receipt of each record.

12. The computer program product of claim 10, wherein the buffer structure is stored in a mass memory of the data-processing system.

13. The computer program product of claim 10, wherein at least one of the purging criteria is based on a temporal characteristic of the records.

14. A system for logging at least one stream of records in a data-processing system, the system comprising:
    a processor, a computer readable memory, and a computer readable storage medium;
    first program instructions to receive a stream of records in succession,
    second program instructions to log records from the stream of records into a log structure, and
    third program instructions to, in response to fulfillment of a pre-defined purging condition:
      divert the logging of the records to a buffer structure,
      purge the log structure according to a set of purging criteria in response to the diverting,
      move the records logged in the buffer structure to the log structure in response to a completion of the purging, and
      restore the logging to the log structure in response to a completion of the moving, further program instructions to:
      copy the records being deleted from the log structure during the purging thereof into a back-up structure in association with an indication of the corresponding fulfilled purging criteria,
      receive a restoring command comprising an indication of a set of restoring criteria based on the purging criteria, and
      restore the records from the back-up structure to the log structure, according to a comparing between the restoring criteria and the corresponding fulfilled purging criteria, in response to the restoring command;

and wherein the first, second, third and further program instructions are stored on the computer readable storage medium and executed by the processor via the computer readable memory.

15. The system of claim 14, further comprising:

fourth program instructions to verify the fulfillment of the purging condition by comparing a size of the log structure with a threshold in response to the receipt of each record; and wherein the fourth program instructions are stored on the computer readable storage medium and executed by the processor via the computer readable memory.

16. The system of claim 14, wherein the buffer structure is stored in a mass memory of the data-processing system.

17. The system of claim 14, wherein at least one of the purging criteria is based on a temporal characteristic of the records.

* * * * *